United States Patent [19]

Van de Velde et al.

[11] Patent Number: 4,659,982
[45] Date of Patent: Apr. 21, 1987

[54] MICROWAVE APPARATUS AND METHOD OF OPERATION TO DETERMINE POSITION AND/OR SPEED OF A MOVABLE BODY OR DISCONTINUITY OR CHANGE IN A MATERIAL

[75] Inventors: Jean-Claude Van de Velde, Mons-En-Baroeul; Yves Leroy; Ahmed Mamouni, both of Villeneuve D'Ascq, all of France

[73] Assignee: Centre National de la Recherches Scientifique, Paris, France

[21] Appl. No.: 741,604

[22] Filed: Jun. 5, 1985

[30] Foreign Application Priority Data

Jun. 21, 1984 [FR] France ................................ 84 10286
Mar. 12, 1985 [FR] France ................................ 85 03990

[51] Int. Cl.⁴ ........................................... G01R 23/16
[52] U.S. Cl. .................................. 324/77 G; 342/192
[58] Field of Search ..................... 343/407, 9 R, 55 A; 324/77 G, 77 D, 77 B

[56] References Cited

U.S. PATENT DOCUMENTS 4,040,057 8/1977 Cross et al. ..................... 343/55 A
4,131,890 12/1978 Outram .............................. 324/77 G

*Primary Examiner*—Michael J. Tokar
*Attorney, Agent, or Firm*—Burns, Lobato & Adams

[57] ABSTRACT

This method of constructing microwave systems and processing the signal by correlation is applicable notably to tachometric, telemetric, directional and tracking control systems, to the detection of heterogeneousness and discontinuity in materials by using sensors of the direct-contact or contactless type. The method, based on microwave radiation and utilizing microwave receiving aerials and at least one correlator, comprises the steps of emitting through a radiating aerial a single microwave radiation from a microwave source having predetermined characteristics; receiving the transmitted microwave by means of receiving aerials disposed at different locations; directing the signal thus received towards one or a plurality of correlators, and analyzing the frequency spectrum of the output signal of the correlator or correlators by using Fourier's transformed curve circuits or any other means capable of extracting the fundamental of the output signal or measuring the time elapsing between two passages through zero of the output signal.

25 Claims, 10 Drawing Figures

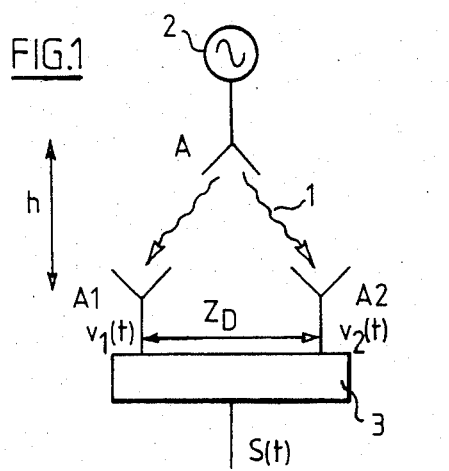
FIG.1
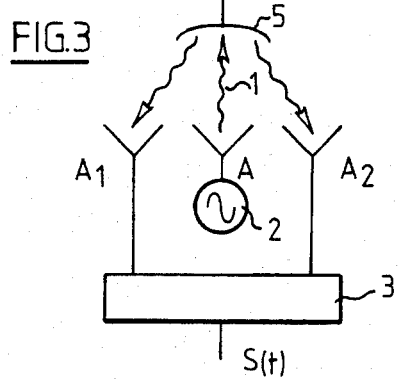
FIG.3
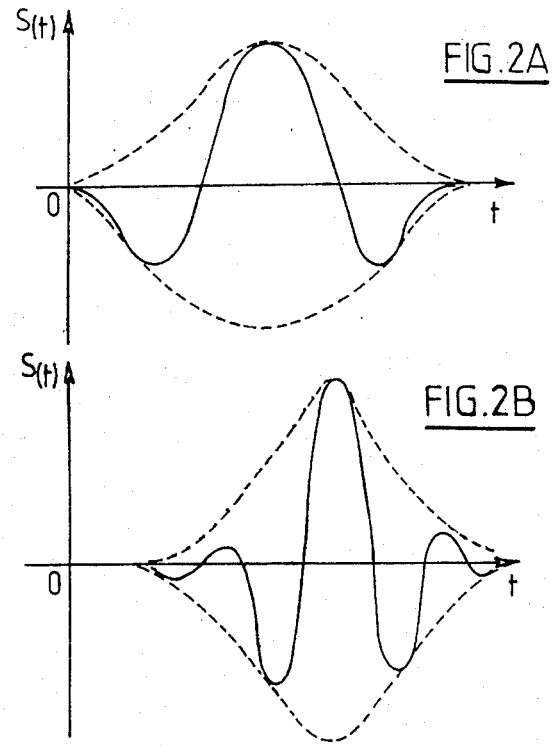
FIG.2A
FIG.2B
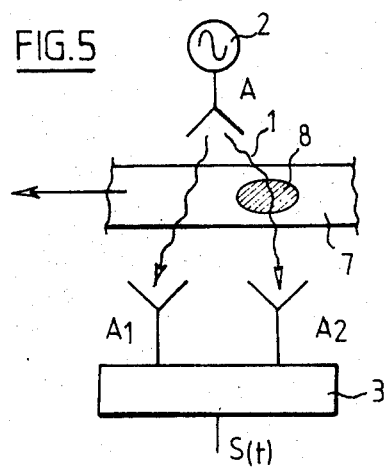
FIG.5
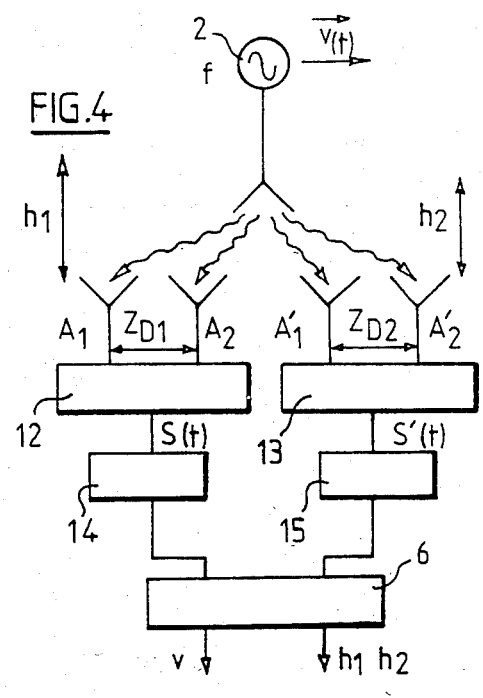
FIG.4

MICROWAVE APPARATUS AND METHOD OF OPERATION TO DETERMINE POSITION AND/OR SPEED OF A MOVABLE BODY OR DISCONTINUITY OR CHANGE IN A MATERIAL

BACKGROUND OF THE INVENTION

1. Field of the Invention

This invention relates to a method of constructing microwave systems and processing the signal by correlation.

This invention is applicable notably in tachometry, telemetry, directional servo-control and tracking, notably in robotics, the detection of heterogeneousness and discontinuity in a given material from sensors of the contact or contactless type.

2. The Prior Art

Nowadays, the main techniques utilized in contactless tachometry are based on the Doppler effect. This phenomenon is applicable in many fields and notably for ascertaining with precision the speed of a moving body by transmitting a wave of predetermined frequency towards the moving body and analysing the frequency reflected by said movable body.

It is known that when a change occurs in the distance between a source emitting a fixed frequency and a receiving aerial, the apparent frequency received by the aerial is shifted in relation to the emitter frequency. This shift is proportional to the velocity of movement of the emitter in relation to the receiver along the axis interconnecting them.

However, a tachometer based on the Doppler effect is scarcely sensitive when the distance from the source to the object under observation varies moderately with time, for example when the object is travelling in a direction perpendicular to the observation direction. In fact, the inconvenience lies in the fact that the direction of propagation of the incoming wave and of the reflected wave must lie substantially in the direction of travel of the movable body if an optimal measurement precision is desired.

SUMMARY OF THE INVENTION

The technical method developed by the Applicants and disclosed hereinafter differs considerably from the prior art techniques and is applicable more particularly but not exclusively to such cases wherein the movable body travels at right angles to the observation direction.

Besides, the present invention is applicable notably to the measurement, from the resulting signals, of the distance between the movable body and the observation point, by changing the experimental conditions and parameters such as notably the distance between the movable bodies and the distance between the various receiving aerials.

At present, direction control or tracking techniques are based generally either on the Doppler effect, or on the measurement of the propagation time of an incident and reflected wave. For the above-expressed reasons, these methods are not fully satisfactory.

The modern detection of heterogeneousness and discontinuity in a material is based on various techniques, such as notably X-ray or supersonic echography. Now X-ray apparatus require the exertion of care, the use of suitable shielding means, and is attended by serious dangers. Ultrasonic echography, on the other hand, is efficient only in very specific circumstances and cannot be extended to any broad field.

Moreover, it is interesting to implement waves of different natures such as microwaves which are responsive to other physical parameters, notably the permissivity of the medium to the working frequency. Therefore, such waves may be useful for supplying different or complementary information, and are therfore advantageous in comparison with hitherto known techniques.

Furthermore, non-destructive methods of testing materials are also known, but these methods are based only on the transmission of microwaves in the form of a single beam between a transmitting or radiating aerial and a receiving aerial. On the other hand, the method according to the present invention provides more data since it emits several beams with in addition due consideration for the phase differences resulting from these multiple paths, due to the use of a correlator.

It is therefore the primary object of the present invention to provide a method of constructing microwave systems and processing the signal by correlation, this method being relatively easy to carry out in various fields such as tachometry, telemetry, directional control and tracking servo-systems, and the detection of heterogeneousness and discontinuity in materials, and the like.

The method of the present invention is based on the use of conventional microwave systems, therefore of currently available equipments.

More particularly, in tachometry, the method of the present invention is suitable for making measurements by so locating the receiving device or devices that the observation direction of the aerial be perpendicular to the path of the movable body.

In conjunction and simultaneously with the speed measurement, the method of the present invention also permits of measuring the distance or the change in the distance between the movable body and the point of observation.

A modified form of embodiment of the present invention consists in detecting the case in which the movable body is located just in the direction or line of observation of the receiver, that is, on the imaginary axis perpendicular to the median point of the straight line interconnecting the receiving aerial. Thus, the present invention is also applicable notably to the control of remote-controlled missiles or vehicles, or in robotics.

It is another object of the present invention to provide a method of constructing microwave systems and processing the signal by correlation, this method being applicable notably to the detection of the evolution, in the course of time, of a physical electromagnetic parameter as a function of another physical parameter of the material, or to the detection of heterogeneousness or discontinuity in the characteristic properties of the material during its movement.

Other objects and advantageous features of the present invention will appear as the following description proceeds which is given by way of example, not of limitation.

According to the present invention, the method of constructing microwave systems and processing the signal by correlation, which is based on the phenomenon of microwave radiation, and utilizes microwave receiving aerials and at least one correlator, is characterized in that:

a single microwave radiation is transmitted with the assistance of a microwave source having predetermined characteristics, and of a radiating aerial A, the transmitted microwave radiation is picked up by means of receiving aerials A1, A2 disposed at different locations;

the signals received by the receiving aerials A1, A2 are fed to one or a plurality of correlators, the frequency spectrum of the output signal or the correlator or correlators is analysed.

A clearer understanding of the instant invention will be had by reading the following description given with reference to the accompanying drawings.

THE DRAWINGS

FIG. 1 is a diagrammatic illustration of the means for carrying out the method of the present invention for constructing microwave systems and processing the signal by correlation;

FIGS. 2a and 2b illustrate the waveform of the correlator output signal in the case of a typical application to telemetry when two different speeds are implements;

FIG. 3 illustrates diagrammatically a device for carrying out the method of the present invention in the case of a tachometry application;

FIG. 4 is another diagrammatical view of a device for carrying out the method of the present invention for speed and distance measurements;

FIG. 5 is a similar diagrammatic view showing a device for detecting the heterogeneousness and discontinuity of a material according to the method of the present invention;

DESCRIPTION OF THE PREFERRED EMBODIMENTS

Figure 8:
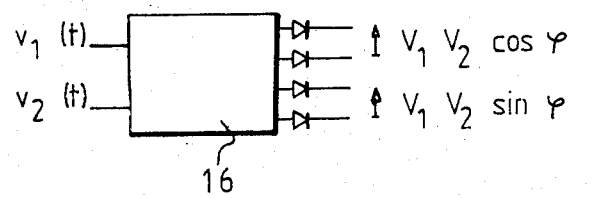
FIG. 8 illustrates a detail of a correlator suitable for carrying out the method of the present invention.

It is known to use the principle of correlation for analysing the relationship existing between two signals received from different sources. Thus, in the conventional method utilizing the correlation principle it is possible, in a predetermined configuration, to determine the relationship existing between two signals of which one signal has well-defined characteristics.

According to the method of constructing microwave systems and processing the signal by correlation according to the present invention, a microwave generator having predetermined characteristics is used, the radiation transmitted by this generator being received by means of separate aerials. Since in the present case the nature of the emitted signal is already known, analysing the received signal will provide the data message for determining the specific configuration in which the signal is transmitted and received by the correlator.

Therefore, this method is based on an exploitation of the correlation which differs from the conventional process. This method of constructing microwave systems and processing the signal by correlation according to the present invention is applicable to many specific fields, notably in tachometry, telemetry, directional control and tracking correctors, for detecting heterogeneousness and discontinuity in various materials, etc. These various applications will be discussed sequentially in the following description.

Stress is laid on the fact that throughout the specification reference is made to microwave. However, this definition should be taken in its broadest meaning and applies also to any electromagnetic or acoustic radiation.

A typical device for carrying out the method of the present invention is illustrated diagrammatically in FIG. 1 of the drawings.

The method of constructing microwave systems and processing the signal by correlation according to the present invention is based on a microwave radiation designated by reference numeral 1 in FIG. 1, this radiation being produced by a generator 2 consisting of a microwave source associated with an aerial A radiating microwaves 1 at a frequency f.

A single source of radiation is used in the present invention, and this source has predetermined characteristics corresponding preferably to amplitude and frequency values that are stable in time.

More particularly, according to the present invention, a microwave generator having predetermined characteristics and operating either at a fixed frequency or at different frequencies, or at a frequency changing either continuously or in a discrete manner with time, is used.

The incoming radiation, received by the two aerials A1 and A2 spaced by a distance ZD, is fed to a correlator 3 delivering an output signal S(t).

The method of constructing microwave systems and processing the signal by correlation consists in emitting a microwave radiation by means of said microwave generator of which the characteristics are disclosed hereinafter, and by means of an emitting aerial A, in receiving the thus transmitted microwave radiation by means of receiving aerials A1 and A2 disposed at different locations, feeding the signals received by the receiving aerials A1 and A2 to one or a plurality of correlators, subsequently analysing the frequency spectrum of said output signal S(t) or said correlator or correlators.

It is known that if v1(t) is the signal received by aerial A1, and if v2(t) is the signal received by aerial A2, the correlator output signal S(t) will be such that:

$$S = Kv1(t).v2^*(t-\tau) = KV1V2 \cos(\phi + 2\pi f\tau)$$

wherein K is a constant characteristic of the circuit; v1(t) and v2(t) are the voltages received by the aerials of which the amplitudes are V1 and V2, respectively; $\phi$ is the phase shift corresponding to the difference in the wave path between the emitter aerial A on the one hand and the receiving aerials A1 and A2 on the other hand, and $\tau$ is the delay time introduced by correlator 3.

According to the present invention, the frequency spectrum of the output signal S(t) of the correlator or correlators is analysed, as shown in FIGS. 2a or 2b, according to Fourier's transformed curve (FFT), or by using any device suitable for extracting the fundamental of the output signal, or any other means permitting of measuring the time period elapsing between two passages through zero of said output signal.

FIG. 1 shows a typical tachometric application for measuring the speed of a movable body travelling preferably parallel to the imaginary axis interconnecting the receiving aerials A1 and A2. In this specific application, it is assumed that the microwave source is solid with the movable body, but the latter is not shown in this Figure.

Still in the example of FIG. 1, the receiving aerials A1 and A2 are disposed in relation to each other according to the direction of travel of the movable body. Consequently, this arrangement contrasts with the arrangement normally utilized in Doppler effect tachometric systems, with the undeniable advantage, in the present arrangement, that it is possible to position the measuring means outside the path followed by the movable body.

Considering the above-mentioned relationships giving the amplitude of the output signal S(t) of correlator 3, a signal as a function of time, which is of the type shown in FIGS. 2a and 2b, is obtained.

These signals correspond to interference fringes because the phase shift $\phi$ varies with the movement of the body under observation. These fringes are damped since the electromagnetic coupling between the registering radiating aerial A and the receiving aerials A1, A2 has its maximum value when these aerials are disposed in front of each other, this coupling decreasing when the emitter aerial A on the one hand and the receiving aerial A1 and A2 on the other hand do not register with each other.

More particularly, the signals shown in FIGS. 2a and 2b correspond to a delay time $\pi=0$.

The time during which the output signal S(t) of correlator 3 is significant is inasmuch longer as the speed of the movable body decreases. Thus, in the example illustrated in FIG. 2, FIG. 2b corresponds to a movable body disposed at the same distance h from correlator 3 as in the case contemplated in FIG. 2a and travelling at a speed two times higher than that contemplated for the case of FIG. 2a.

Under these conditions, by taking advantage of the spectrum frequency S(t) according to Fourier's transformed curve, or by using any other device permitting of either extracting the fundamental of the signal or measuring the time period elapsing between two passages of said signal through zero, it is possible to determine the distance and speed of the movable body, notably without any physical contact and by using the same sensor.

Reference will now be made to FIG. 3 showing diagrammatically a modified form of embodiment of the method of the present invention for constructing microwave systems and processing the signal by correlation, in the case of a specific tachometric application. The preceding example (FIGS. 1, 2a and 2b) was objectionable because the microwave source 2 was compulsorily mounted on board the movable body of which the speed had to be measured. In the example of FIG. 3, the microwave generator 2 is connected to a radiating aerial A directing the incident microwave radiation 1 towards the movable body 4.

This body 4 will thus reflect one fraction of the incident radiation 1 towards the receiving aerials A1 and A2. These receiving aerials are coupled to a correlator 3 delivering an output signal S(t) similar to the output signal generated in the preceding example. To improve the method, this movable body may be provided with an aerial 5 or any other passive device capable of reflecting the incident signal 1.

It will be seen that according to the present invention various types of aerials may be used, for example parabolic aerials, horn-aerials, patch or plated aerials, remote-operating aerials in a closed field or in a remote field or with a direct contact.

As in the case of FIG. 1, the receiving aerials A1 and A2 are disposed in such mutual relationship that they are aligned in the direction of travel of the movable body 4. The radiating aerial A may if desired be disposed between the two receiving aerials A1 and A2 as shown in FIG. 3, but another location may also be contemplated according to circumstances.

The correlator 3 provided for carrying out the method of the present invention may correspond to the correlator disclosed and illustrated in the French patent application No. 81/09.281 entitled "Microwave thermography by correlation".

However, the correlator may also be made by using a two-grid field effect transistor (FET) or a six-ports network as shown at 16 in FIG. 8, this network 16 giving output signals V1 V2 cos $\phi$ and V1 V2 sin $\phi$ as a function of inputs v1(t) and v2(t).

Figure 9:
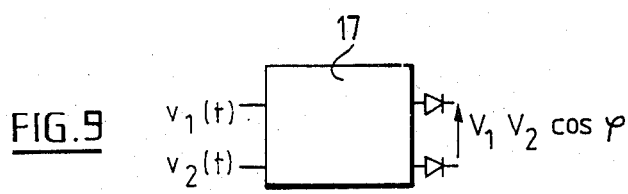
FIG. 9 illustrates a detail of another form of embodiment of a correlator suitable for carrying out the method of the present invention.

The correlator may also be constructed by using a 180-degree hybrid coupler denoted 17 in FIG. 9, followed by two detectors, providing for two input signals v1(t) and v2(t) an output signal proportional to V1V2 cos $\phi$.

However, any other device capable of delivering an output signal S(t) consistent with the above-defined relationship is suitable for carrying out the method of the present invention.

FIG. 4 illustrates diagrammatically the device for carrying out the method of constructing microwave systems and processing the signal by correlation according to the present invention, in the specific case of its application to telemetry.

In the preceding case, with different relative positions of aerials A, A1 and A2, different waveforms are obtained in the output signal of correlator 3. This possibility may be exploited for determining the position of the movable body, for example by using two or more correlators having their receiving aerials disposed at predetermined relative distances.

In the case illustrated in FIG. 4, the distance ZD1 between the receiving aerials A1 and A2 of correlator N° 1, designated by reference numeral 12 in FIG. 4, differs from the distance ZD2 between the receiving aerials A'1 and A'2 of correlator No. 2, denoted 13 in FIG. 4, by disposing the receiving system, the correlator No. 1, the correlator No. 2 and the aerials A1 and A2, A'1 and A'2 at different locations and at different distances h1 and h2 from the path followed by the movable body.

According to the method of the present invention, the output signal S(t) of correlator No. 1, denoted by reference numeral 12, is processed in a first Fourier transformed-curve circuit FFT1 (shown at 14, FIG. 4); the output signal S'(t) of the second Fourier transformed-curve circuit FFT2 (shown at 15 in FIG. 4), and the signals issuing from circuits 14 (FFT1) and 15 (FFT2) are processed in a processing circuit 6 delivering at its output data concerning the speed of the movable body and data concerning on the one hand the distance h1 measured between the movable body and the pair of receiving aerials A1 and A2, and on the other hand the distance h2 measured between the movable body and the pair of receiving aerials A'1 and A'2.

As already pointed out hereinabove, a circuit capable of extracting the fundamental of the output circuit or measuring the time period elapsing between two passages through zero of said output signal may be substituted for the two Fourier transformed-curve circuits.

According to a further feature characterising the method of the instant invention, this method could also be incorporated in a transmission and correlation system operating at different frequencies.

According to another possible form of embodiment of the present invention, the distance and speed of the movable body could also be determined by using a transmitting aerial of the electronic angular scanning type, for example in anti-collision systems.

In the matter of direction correctors, servo-motors and tracking means, if we revert to the example shown in FIG. 1, the microwave source 2 is fixed and the correlator 3 is movable, or vice-versa. When the correlator 3 is travelling along the axis connecting this correlator to the microwave source 2, or in other words when the phase shift $\phi$ is zero, the output signal of correlator 3 has its maximum value when $\tau=0$, this condition corresponding to the above-described relationship.

This property may also be exploited in automatic direction correctors or tracking means, and the method may be extended to space applications by providing three receiving aerials disposed on three coordinates perpendicular to each other. This arrangement is advantageous notably in robotics.

To improve the precision of the method of the present invention, it is preferable to operate with a zero output signal such that S(t) =0. Thus, according to the present invention, the delay time of the correlator is controlled continuously or intermittently, and the delay time of the correlator is set at a preferential value of $\frac{1}{4}$f, in which f is the frequency value of the emitted signal.

FIG. 5 illustrates the application of the method of the present invention to the detection of heterogeneousness and discontinuity in a material. In this case, the general case illustrated in FIG. 1 is applicable and the microwave source 2 as well as the receiving aerials A1 and A2 are fixed.

According to the method of the present invention, the material 7 of which it is desired to test the inner structure is disposed between the microwave transmitting aerial A and the microwave receiving aerials A1 and A2.

This material 7, in the form of a parallel-faced blade in the specific area contemplated, is disposed parallel to the axis interconnecting the receiving aerials A1 and A2. The material to be tested either displays average microwave losses or is dielectrical, so that the output signal S(t) of the correlator is not zero.

As long as the areas to be tested by microwave radiation in the material 7 have the same structural or geometrical properties, the output signal S(t) remains constant. These areas receiving the electromagnetic radiation 1 therethrough are located between the transmitting aerial A and the receiving aerials A1 and A2. When a heterogeneousness 8 or a discontinuity such as the one caused by a different thickness, or a crack, appears, this change can be detected through the variation in the output signal S(t) of correlator 3.

Besides, it is possible to use several devices of this character operating at different frequencies, when necessary.

Figure 6:
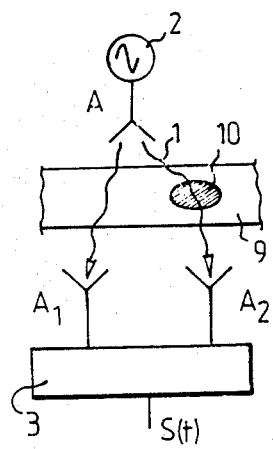
FIG. 6 illustrates diagrammatically a device for detecting the evolution in the course of time of an electromagnetic physical parameter as a function of another physical parameter in a material, according to the method of the present invention.

FIG. 6 shows the application of the method of the present invention to the detection of the evolution in time of another physical parameter in the material to be tested, such as its moisture content or its structural heterogeneousness.

This method is suitable notably for observing the evolution of the complex permettivity of a material as a function of its temperature. In this case, and according to the present invention, the method comprises following steps :

A microwave radiation 1 generated by a fixed microwave source 2 is transmitted by means of a transmitting aerial A;

the transmitted microwave radiation is received by means of the pair of receiving aerials A1 and A2, and the output signals of these aerials are fed to a correlator 3 of which the output signal is analysed, and the material 9 to be tested, of which the physical characteristics are likely to change with time, is interposed between the transmitting aerial A and the receiving aerials A1 and A2, the sub-investigation area 10 of said material 9 being fixed in relation to said transmitting and receiving aerials A, A1 and A2.

As long as the area 10 of the material 9 to be tested, which is exposed to the microwave radiation, has the same structural properties, the output signal S(t) remains constant. When the complex permettivity of said area 10 of the tested material 9 changes as a function of temperature, this change is detected through a variation in the output signal S(t) of correlator 3 which will thus permit of controlling this evolution in the properties of said area 10.

Figure 7:
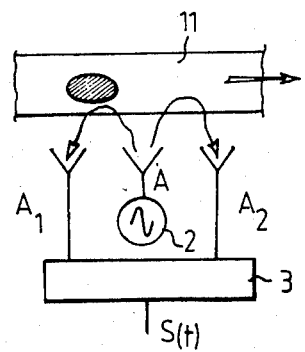
FIG. 7 is a diagrammatic illustration of a device for detecting the heterogeneousness and discontinuity of a material according to the method of the instant invention.

FIG. 7 refers to the method of the present invention in the exemplary application thereof to a device for detecting heterogeneousness and discontinuity in a material.

In the foregoing, a method of processing the output signal by correlation has been described in connection with its specific application to the detection of heterogeneousness and discontinuity in the tested material, the material constituting a movable body as illustrated in FIG. 5.

The arrangement illustrated in FIG. 7 is a modified version comprising the following steps :

a microwave radiation is transmitted from a fixed microwave source 2 by means of a transmitting or radiating aerial A;

the thus transmitted microwave radiation is received by means of receiving aerials A1 and A2, and the output signals of aerials A1 and A2 are fed to a correlator 3 of which the output signal S(t) is analysed,and the material 11 to be tested is caused to travel in a direction parallel to the imaginary axis interconnecting the two receiving aerials A1 and A2, the three aerials A, A1 and A2 being disposed on the same side with respect to the material in relative motion.

In this case, the signal transmitted by aerial A is received by aerials A1 and A2 after passing through one portion of material 11. This method may be useful notably for detecting variations in the conductivity or disontinuities in the tested material, since such variations will induce observable changes in the output signal S(t).

Although specific forms of embodiment of the present invention have been described hereinabove and illustrated in the accompanying drawings, it will readily occur to those skilled in the art that various modifications and changes may be brought thereto without departing from the scope of the invention as set forth in the appended claims.

What is claimed is new is:

1. A method of determining the position and/or the speed of a movable body which comprises, positioning on said movable body a microwave source of which the characteristics are predetermined and a transmitting antenna A connected with said source, positioning at least two receiving antennas A1 and A2 at fixed positions spaced laterally from the path of movement of said movable body and spaced from one another by a distance ZD on a line at least approximately parallel to the path of movement of said movable body, connecting inputs of a correlator to said receiving antennas A1 and A2, emitting a single microwave signal by means of said microwave source and said transmitting antenna A toward said receiving antennas A1, A2, picking-up by means of said receiving antennas A1 and A2 signals due to microwave radiation of said emitted microwave signal, the signal received by antenna A1 being designated v1(t) and the signal received by antenna A2 being designated v2(t), directing said signals v1(t) and v2(t) received by said antennas A1 and A2 respectively to said correlator, said correlator delivering an output signal S(t) given by the following relation:

$$\overline{S = Kv1(t) \cdot v2 \ (T-\tau)} = KV1V2 \cos (\phi + 2\pi f\tau)$$

in which K is a constant charateristic of the circuit, v1(t) and v2(t) are the voltage received by the antennas A1 and A2 respectively of which the amplitudes are v1 and v2 respectively, $\phi$ is the phase shift corresponding to the difference of the wave paths between the transmitting antenna A and the receiving Antennas A1 and A2 spaced by the distance ZD and $\tau$ is the delay time introduced by the correlator, and analyzing the frequency spectrum of the output signal S(t) of the correlator.

2. A method of determining the position and/or speed of a movable body according to claim 1, in which the frequency spectrum of the output signal S(t) of said correlator is analyzed according to Fourier's transformed curve (FFT).

3. A method of determining the position and/or speed of a movable body according to claim 1, in which the frequency spectrum of the output signal of said correlator is analyzed by measuring the time period elapsing between two passages of said output signal through zero.

4. A method of determining the position and/or speed of a movable body according to claim 1, in which said correlator comprises a 180° hybrid coupler followed by two detectors.

5. A method of determining the position and/or speed of a movable body according to claim 1, in which said correlator comprises a six-port network giving output signals V1 V2 cos $\phi$ and V1 V2 sin $\phi$ as a function of inputs v1(t) and v2(t).

6. A method of determining the position and/or speed of a movable body according to claim 1, in which said correlator comprises a two-grid field effect transistor.

7. A method of determining the position and/or speed of a movable body, according to claim 1 in which two pairs of receiving antennas A1, A2 and A'1, A'2 are positioned in fixed position spaced laterally from the path of movement of said movable body on a line at least approximately parallel to the path of movement of said movable body, the distance between said antennas A1, A2 of one pair being different from the distance between said antennas A'1, A'2 of the other pair, in which there are two correlators, one receiving signals from said antennas A1, A2 of one pair and the other receiving signals from said antennas A'1, A'2 of the other pair, and in which the output signals of said correlators are fed to a processing circuit.

8. A method of determining the position and/or the speed of a movable body which comprises, positioning at a fixed position spaced laterally from the path of movement of said movable body a microwave source and a transmitting antenna connected with said microwave source and propagating microwave radiation toward said movable body, positioning at least two receiving antennas A1 and A2 at fixed positions spaced laterally from the path of movement of said movable body and spaced from one another by a distance ZD on a line at least approximately parallel to the path of movement of said movable body, connecting inputs of a correlator to said receiving antennas A1 and A2, emitting a single microwave signal by means of said microwave source and said transmitting antenna A toward said movable body, picking-up by means of said receiving antennas A1 and A2 signals due to reflection by said movable body of microwave radiation of said emitted microwave signal, the signal received by antenna A1 being designated v1(t) and the signal received by antenna A2 being designated v2(t), directing said signals v1(t) and V2(t) received by said antennas A1 and A2 respectively to said correlator, said correlator delivering an output signal S(t) given by the following relation:

$$\overline{S = Kv1(t) \cdot v2^* \ (-\tau)} = KV1V2 \cos (\phi + 2\pi f\tau)$$

in which K is a constant characteristic of the circuit, v1(t) and V2(t) are the voltages received by the antennas A1 and A2 respectively of which the amplitudes are v1 and v2 respectively $\phi$ is the phase shift corresponding to the difference of the wave path between the transmitting antenna A and the receiving antennas A1 and A2 spaced by the distance ZD and $\tau$ is the delay time introduced by the correlator, and analyzing the frequency spectrum of the output signal S(t) of the correlator, 9. A method of determining the position and/or the speed of a movable body according to claim 8, in which said transmitting antenna A is positioned between said receiving antennas A1 and A2.

10. A method of determining the position and/or the speed of a movable body according to claim 8, in which a reflecting antenna is mounted on said movable body for reflecting microwave radiation from said transmitting antenna A to said receiving antennas A1 and A2.

11. A method of determining the position and/or the speed of a movable body according to claim 8, in which the frequency spectrum of the output signal S(t) of said correlator is analyzed according to Fourier's transformed curve (FFT).

12. Amethod of determining the position and/or the speed of a movable body according to claim 8, in which the frequency spectrum of the output signal of said correlator is analyzed by measuring the time period elapsing between two passages of said output signal through zero.

13. A method of determining the position and/or the speed of a movable body according to claim 8, in which said correlator comprises a 180° hybrid coupler followed by two detectors.

14. A method of determining the position and/or the speed of a movable body according to claim 8, in which said correlator comprises a six-port network giving output signals V1V2 cos$\phi$ and V1V2 sin $\phi$ as a function of inputs V1(t) and v2(t).

15. A method of determining the position and/or speed of a movable body according to claim 8, in which said correlator comprises a two-grid field effect transistor 16. A method of detecting heterogenerousness, discontinuity or change in a material which comprises,
    positioning a microwave source and a transmitting antenna A connected with said microwave source in position to propagate microwave radiation toward said material,
    positioning at least two receiving antennas A1 and A2 at positions spaced laterally from said material and spaced from one another by a distance ZD,
    connecting inputs of a correlator to said receiving antennas A1 and A2,
    emitting a single microwave signal by means of said microwave source and said transmitting antenna A toward said material,
    picking up by means of said receiving antennas A1 and A2 microwave signals from said material due to microwave radiation of said microwave signal emitted by said transmitting antennas A, the signal received by antenna A1 being designated v1(t) and the signal received by antenna A2 being designated v2(t),
    directing said signals v1(t) and v2(t) received by said antennas A1 and A2 respectively to said correlator, said correlator delivering an output signal S(t) given by the following relation:

$$\overline{S = Kv1(t) \cdot v2^*(T-\tau)} = KV1V2 \cos(\phi + 2\pi f\tau)$$

in which K is a constant characteristic of the circuit, Vl(t) and V2(t) are the voltage received by the antennas A1 and A2 respectively of which the amplitudes are v1 and v2 respectively, $\phi$ is the phase shift corresponding to the difference of the wave path between the transmitting antenna A and the receiving antennas A1 and A2 spaced by the distance ZD and $\tau$ is the delay time introduced by the correlator, and
    analyzing the frequency spectrum of the output signal S(t) of the correlator.

17. A method of detecting heterogeneousness discontinuity or change in a material according to claim 16 in which said transmitting antenna A is positioned between said receiving antennas A1 and A2.

18. A method of detecting heterogeneousness, discontinuity or change in a material according to claim 16 in which said transmitting antenna A and said receiving antennas A1 and A2 are positioned on opposite sides of said material.

19. A method of detecting heterogeneousness, discontinuity or change in a material, according to claim 16 in which said material is shifted in a direction at least approximately parallel to a line connecting said receiving antennas A1 and A2.

20. A method of detecting heterogeneousness, discontinuity or change in a material according to claim 16, in which the frequency spectrum of the output signal S(t) of said correlator is analyzed according to Fourier's transformed curve (FFT).

21. A method of detecting heterogeneousness, discontinuity or change in a material according to claim 16, in which the frequency spectrum of the output signal of said correlator is analyzed by measuring the time period elapsing between two passages of said output signal through zero.

22. A method of detecting heterogeneousness, discontinuity or change in a material according to claim 16, in which said correlator comprises a 180° hybrid coupler followed by two detectors.

23. A method of detecting heterogeneousness, discontinuity or change in a material according to claim 16, in which said correlator comprises a six-port network giving output signals V1 V2 cos $\phi$ and V1 V2 sin $\phi$ as a function of inputs v1(t) and v2(t).

24. A method of detecting heterogeneousness, discontinuity or change in a material according to claim 16, in which said correlator comprises a two-grid field effect transistor.

25. A method of determining the position and/or speed of a movable body according to claim 1, in which means is provided for controlling the delay time of said correlator.

* * * * *